United States Patent
Ferguson

(10) Patent No.: US 7,102,667 B2
(45) Date of Patent: Sep. 5, 2006

(54) PICTURE QUALITY DIAGNOSTICS FOR REVEALING CAUSE OF PERCEPTIBLE IMPAIRMENTS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 562 days.

(21) Appl. No.: 10/102,405

(22) Filed: Mar. 18, 2002

(65) Prior Publication Data
US 2003/0174212 A1 Sep. 18, 2003

(51) Int. Cl.
H04N 17/00 (2006.01)
(52) U.S. Cl. .................... 348/180; 348/181; 382/228; 702/69
(58) Field of Classification Search ........... 348/180, 348/181, 184, 192; 382/228, 276; 700/28–30; 702/57, 66, 69, 81; 703/23
See application file for complete search history.

(56) References Cited

U.S. PATENT DOCUMENTS

| | | | | |
|---|---|---|---|---|
| 5,664,158 A | * | 9/1997 | Larimer | 703/23 |
| 5,694,484 A | * | 12/1997 | Cottrell et al. | 382/167 |
| 5,715,334 A | * | 2/1998 | Peters | 382/254 |
| 6,285,797 B1 | * | 9/2001 | Lubin et al. | 382/254 |
| 6,437,821 B1 | * | 8/2002 | Janko et al. | 348/180 |
| 6,512,538 B1 | * | 1/2003 | Hollier | 348/192 |
| 6,577,764 B1 | * | 6/2003 | Myler et al. | 382/228 |
| 6,597,473 B1 | * | 7/2003 | Rasmussen et al. | 358/1.9 |
| 6,813,390 B1 | * | 11/2004 | Ali | 382/278 |

* cited by examiner

*Primary Examiner*—Victor R. Kostak
(74) *Attorney, Agent, or Firm*—Francis I. Gray; Matthew D. Rabdau

(57) ABSTRACT

A picture quality diagnostics apparatus and method generates a human vision model response based on a human vision model for a test input video signal. Also objective measure maps for different impairment types are generated from the test input video signal. The objective measure maps are applied as masks to the human vision model response to produce objectively filtered subjective maps. The objectively filtered subjective maps are analyzed to give the respective proportions of the different objective impairment types contributing to perceptual impairment or difference for the test input video signal.

6 Claims, 2 Drawing Sheets

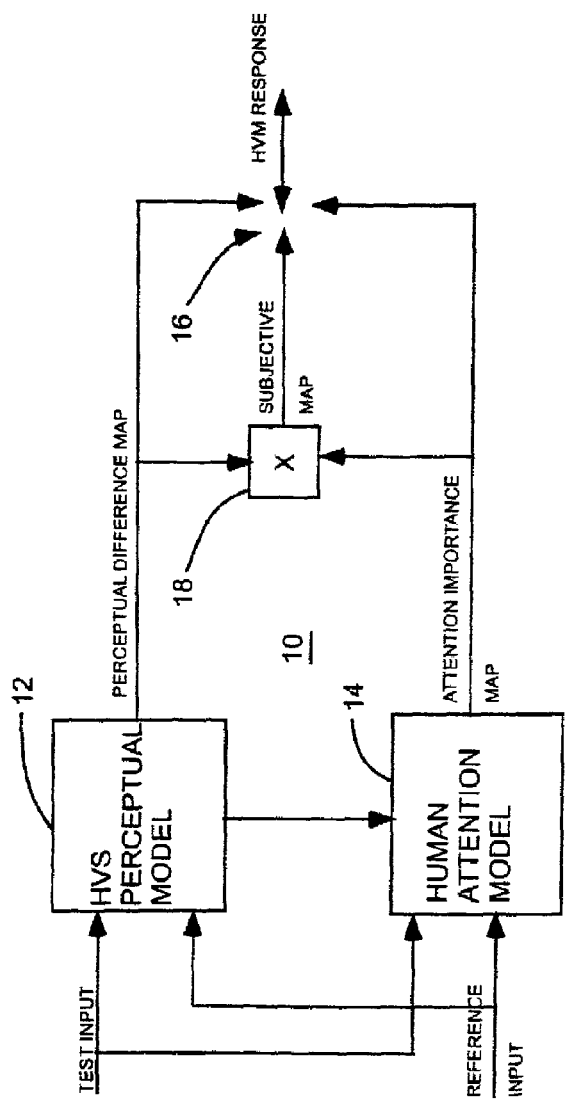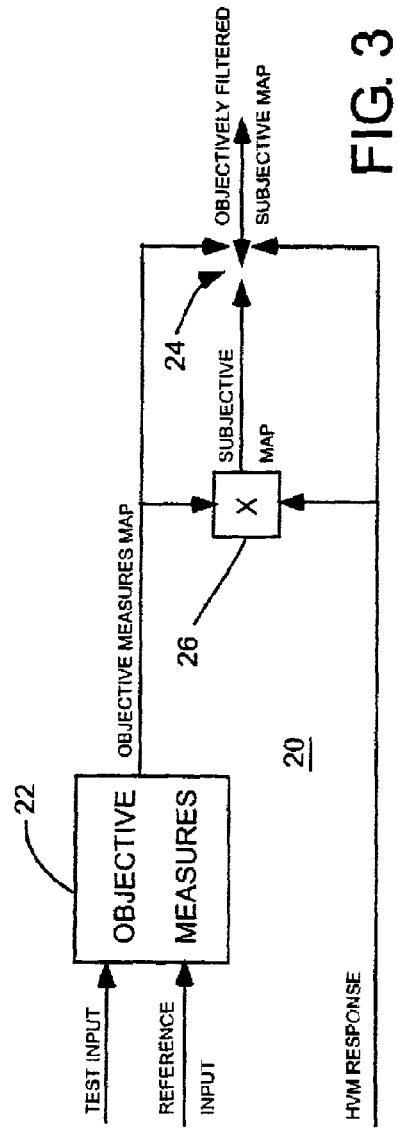

PICTURE QUALITY DIAGNOSTICS FOR REVEALING CAUSE OF PERCEPTIBLE IMPAIRMENTS

BACKGROUND OF THE INVENTION

The present invention relates to video quality of service, and more particularly to picture quality diagnostics for revealing the cause of perceptible picture impairments.

Current picture quality measurement algorithms use a human vision system model to which a test picture/video signal and an optional reference picture/video signal are input. The result is a subjective quality map that shows regions of the picture/video that have perceptible impairments, but not the reason for the impairments. For example there may be a trade-off between blockiness, blurring and jerkiness of motion at a given compression rate, depending on encoder settings. How visible these impairments are determines how to set encoder parameters to improve video quality of the compressed video. It is desirable to determine how visible each impairment type is in order to set the encoder parameters.

What is desired is picture quality diagnostics that reveal the cause of perceptible picture impairments.

BRIEF SUMMARY OF THE INVENTION

Accordingly the present invention provides picture quality diagnostics for revealing the cause of perceptible picture impairments by filtering a human vision model response from a human vision system model with an objective measures filter to produce a summary of measurements from the human vision model response for each of specified perceptible picture impairment causes.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 2 is a block diagram view of a human vision system model for the picture quality diagnostics apparatus according to the present invention.

FIG. 3 is a block diagram view of an objective measure weighting apparatus for the picture quality diagnostics apparatus according to the present invention.

DETAILED DESCRIPTION OF THE INVENTION

Figure 1:
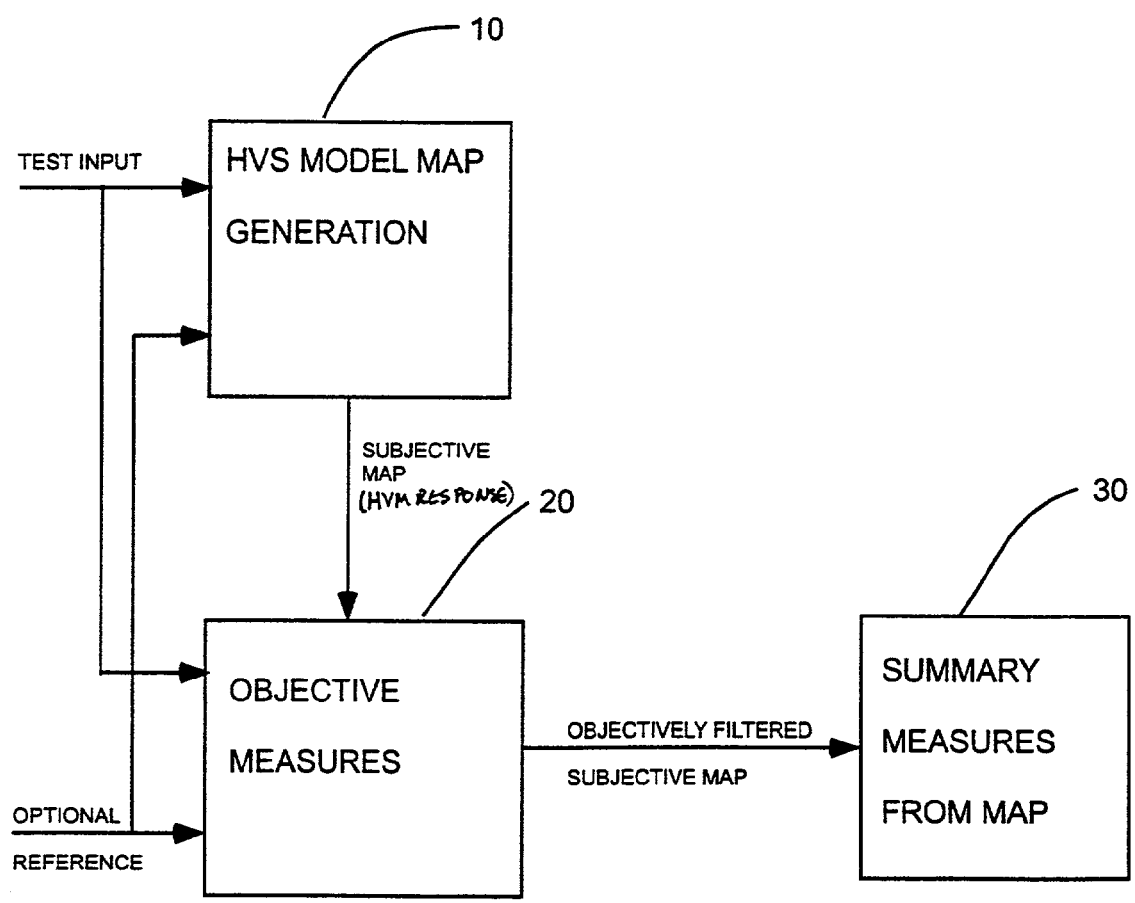
FIG. 1 is a block diagram view of a picture quality diagnostics apparatus according to the present invention.

Referring now to FIG. 1 a test input video signal with perceptible impairments is input to a human vision system model map generator 10 together with an optional reference input video signal from which the test input video signal was derived. Output from the human vision system model map generator 10 is a human vision model (HVM) response for each image or picture of the test input video signal. The test input video signal and the optional reference input video signal also are input to an objective measures weighting apparatus 20 together with the HVM response from the human vision system model map generator 10. The output from the objective measures weighting apparatus 20 is an objectively filtered subjective map that in turn is input to a processor 30 to provide summary measures from the map. The summary measures give a more direct quantification of the contribution of each objective impairment to the overall perceptible impairment in the test input video signal.

The human vision system model map generator 10 is shown in greater detail in FIG. 2 where the test input video and optional reference video signals are input to a human vision perceptual model 12, such as that described in pending U.S. patent application Ser. No. 10/076,853 entitled "Predicting Human Vision Perception and Perceptual Difference" by the present inventor and filed on Feb. 14, 2002. The output from the human vision system perceptual model 12 is a perceptual response map or perceptual difference map. The human vision system perceptual model 12 may also provide the perceptual response map or perceptual difference map to a human attention model 14, such as that described in U.S. Pat. No. 6,670,963 entitled "Visual Attention Model" by Wilfried M. Osberger issued Dec. 30, 2003. The output from the human attention model 14 is an attention importance map. The attention importance map and the perceptual difference map are input to a switch 16 and to a multiplier 18, the output of which also is input to the switch. The output from the switch 16 is the HVM response. The switch 16 allows a user to choose between the perceptual response alone, the attentional attraction or a combination of the two.

The objective measures weighting apparatus 20 is shown in greater detail in FIG. 3. The test and reference input video signals are applied to an objective measures processor 22 that detects certain types of impairments in the test input video signal, such as blockiness (see U.S. Pat. No. 6,437,821 entitled "Harmonic Measurement of Blockiness in Video Signal" by Janko et al, issued Aug. 20, 2002), noise (see U.S. Pat. No. 6,433,891 entitled "Detection of Gaussian Noise in Video Signal" by Li et al, issued Aug. 13, 2002), blurring (see pending U.S. patent application Ser. No. 10/198,944 entitled "Measurement of Blurring in Video Sequences" by Li et al, filed Jul. 18, 2002), etc. The output from the objective measures processor 22 is an objective measure map that is input to an output switch 24 together with the human vision model response. The objective measure map and the human vision model response also are input to a multiplier 26, the output of which also is input to the output switch 24. The selected output from the output switch 24 is the objectively filtered subjective map.

Each pixel of the successive maps for each picture of the test input video signal is the product of the corresponding pixels of all previous maps in the process chain. All map products after the first map retain the units of the first map. All measure maps after the first map are normalized such that each pixel has a value in the range from 0 to 1.0. In this way all resulting summary measures, such as norm, average, rms, standard deviation, etc., based on the final map output pixels are less than or equal to the summary measures obtained from the first measure map in the processing chain. For example if the human vision model response is taken as the product of the perceptual map and the normalized attention importance map, the corresponding standard deviation of this product is less than or equal to the standard deviation of the pixels from the perceptual map. Likewise if the objectively filtered subjective map is taken as the product of the human vision model response and a normalized blockiness map, where blockiness is the objective measure, the standard deviation of this map is less than or equal to the standard deviation of the human vision mode response.

The ratio of the objectively filtered subjective map standard deviation and the human vision model response standard deviation gives the portion of the human vision model response attributable to blockiness in this example. Blurring may be treated in the same way, as may PSNR, picture quality metrics such as PQR, and DMOS predictions, i.e., they may be filtered using the maps from other specific objective measures. By computing the ratios of the filtered to unfiltered measures, a principle impairment analysis may be performed to give the respective proportions of several different impairment types. This may be used to calibrate or otherwise optimize signal encoding or other processing by focusing on how to reduce the dominant impairment of the set of impairments detected.

Thus the present invention provides picture quality diagnostics for a test input video signal by applying an objective measure map as a mask to subjective maps from a human vision model map generator, cascading as needed, to produce an impairment analysis based upon the ratios of filtered to unfiltered measures.

What is claimed is:

1. A picture quality diagnostic apparatus comprising:
    means for generating a human vision model response from a test input video signal further comprising;
        a) means for generating a perceptual difference map for the test input video based on a human vision perceptual model;
        b) means for generating an attention importance map for the test input video based on a human attention model and an input from the perceptual difference map generating means;
        c) means for multiplying the perceptual difference map with the attention importance map to produce a first subjective map; and
        d) means for selecting between the perceptual difference map, the attention importance map and the first subjective map as the human vision model response;
    means for producing an objectively filtered subjective map from the human vision model response and the test input video signal for different impairment types; and
    means for determining from the objectively filtered subjective map an impairment analysis to give respective proportions of the different impairment types.

2. The apparatus as recited in claim 1 wherein the producing means comprises:
    means for obtaining an objective measures map for the test input video signal based on an objective measures algorithm for each of the different impairment types;
    means for multiplying the objective measures map with the human vision model response to produce a second subjective map; and
    means for selecting between the objective measures map, the human vision model response and the second subjective map as the objectively filtered subjective map.

3. A picture quality diagnostic apparatus comprising:
    means for generating a human vision model response from a test input video signal;
    means for producing an objectively filtered subjective map from the human vision model response and the test input video signal for different impairment types further comprising,
        a) means for obtaining an objective measures map for the test input video signal based on an objective measures algorithm for each of the different impairment types;
        b) means for multiplying the objective measures map with the human vision model response to produce a second subjective map; and
        c) means for selecting between the objective measures map, the human vision model response and the second subjective map as the objectively filtered subjective map;
    means for determining from the objectively filtered subjective map an impairment analysis to give respective proportions of the different impairment types.

4. A method of picture quality diagnostics comprising the steps of:
    generating a human vision model response from a test input video signal by;
        a) generating a perceptual difference map for the test input video based on a human vision perceptual model;
        b) generating an attention importance map for the test input video based on a human attention model and an input from the perceptual difference map generating means;
        c) multiplying the perceptual difference map with the attention importance map to produce a first subjective map; and
        d) selecting between the perceptual difference map, the attention importance map and the first subjective map as the human vision model response; and
    producing an objectively filtered subjective map from the human vision model response and the test input video signal for different impairment types; and
    determining from the objectively filtered subjective map an impairment analysis to give respective proportions of the different impairment types.

5. The method as recited in claim 4 wherein the producing step comprises the steps of:
    obtaining an objective measures map for the test input video signal based on an objective measures algorithm for each of the different impairment types;
    multiplying the objective measures map with the human vision model response to produce a second subjective map; and
    selecting between the objective measures map, the human vision model response and the second subjective map as the objectively filtered subjective map.

6. A method of picture quality diagnostics comprising the steps of:
    generating a human vision model response from a test input video signal;
    producing an objectively filtered subjective map from the human vision model response and the test input video signal tar different impairment types by:
        a) obtaining an objective measures map for the test input video signal based on an objective measures algorithm for each of the different impairment types;
        b) multiplying the objective measures map with the human vision model response to produce a second subjective map; and
        c) selecting between the objective measures map, the human vision model response and the second subjective map as the objectively filtered subjective map; and
    determining from the objectively filtered subjective map an impairment analysis to give respective proportions of the different impairment types.

* * * * *